UNITED STATES PATENT OFFICE.

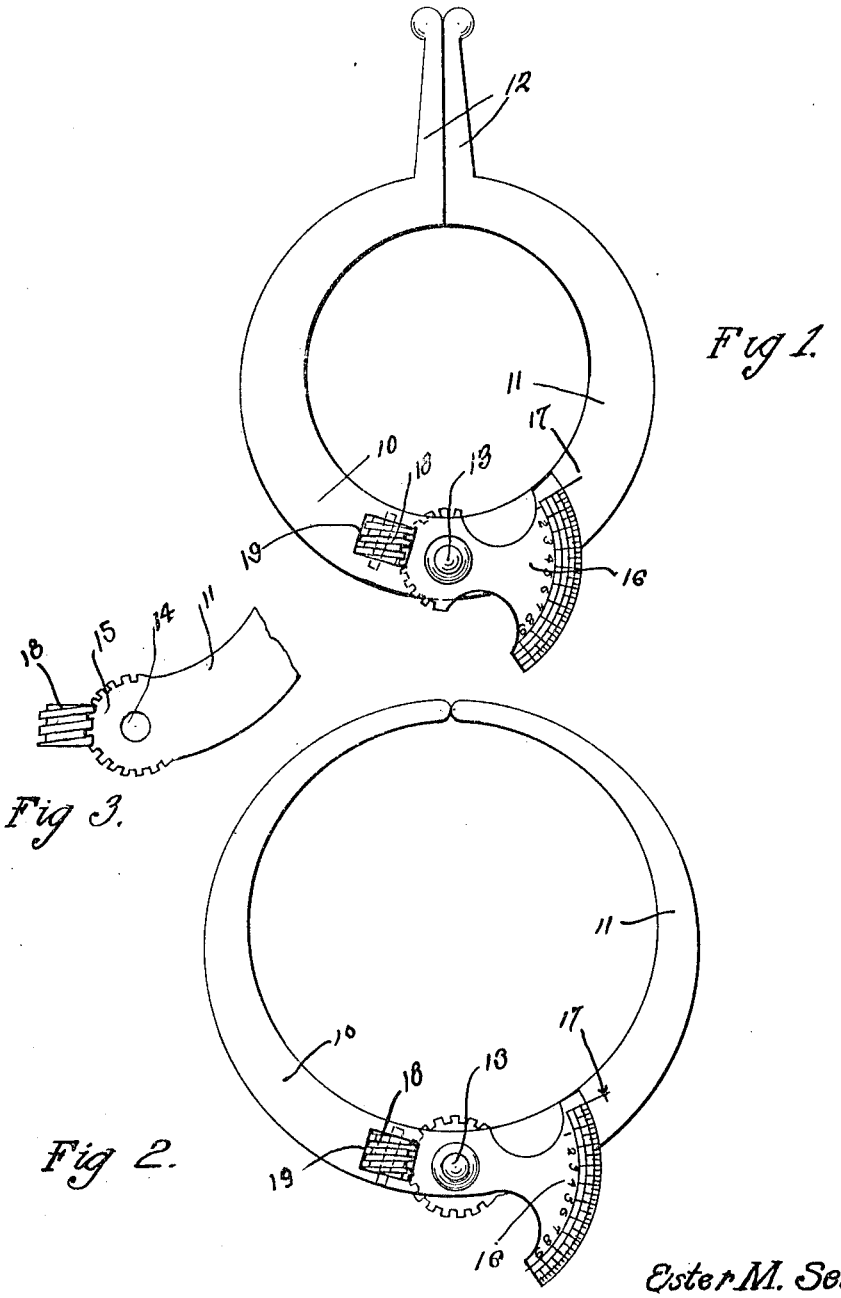

ESTER M. SEALY, OF HONOLULU, TERRITORY OF HAWAII.

CALIPERS.

1,274,460. Specification of Letters Patent. Patented Aug. 6, 1918.

Application filed December 3, 1917. Serial No. 205,166.

*To all whom it may concern:*

Be it known that I, ESTER M. SEALY, a citizen of the United States, residing at Honolulu, in the Territory of Hawaii, have invented certain new and useful Improvements in Calipers, of which the following is a specification.

This invention relates to an improved pair of calipers and the principal object of the invention is to so construct the calipers that a scale may be associated therewith and to further so construct the calipers that they may include a worm and gear for opening and closing the calipers.

Another object of the invention is to so construct these calipers that through turning of the adjusting worm or screw, the jaws may be opened or closed and as the jaws move, the amount of movement registered upon the scale carried by one of the jaws.

Another object of the invention is to so construct the calipers that they may be formed of sheet metal and assembled with a minimum amount of labor.

This invention is illustrated in the accompanying drawings, wherein:—

Figure 1 is a plan view of the improved calipers,

Fig. 2 is a view similar to Fig. 1 showing a slightly modified construction of the free end portions of the jaws, and Fig. 3 is a plan view of one of the jaws and the adjusting screw or worm for moving the jaws.

This pair of calipers will be provided with jaws 10 and 11, the jaw 10 for convenience being termed the stationary jaw and the jaw 11 the movable jaw. The jaws in Fig. 1 have their free end portions extended to provide arms 12 and in this form, the calipers will be used for interior work such for instance as obtaining the interior diameter of a pipe. In the form shown in Fig. 2, the jaws are continued in the arc of a circle and have their end portions meeting and in this form, the calipers will be used for external work, such for instance as obtaining the external diameter of a pipe or shaft. These jaws are pivotally connected by a pin 13 which passes through the jaw 10 and through an opening 14 formed in the gear head 15 of the arm or jaw 11 and from an inspection of Figs. 1 and 2, it will be seen that the jaw 10 extends beyond the pivot point or pin 13 and terminates in an arcuate scale head 16 which moves across the jaw 11 in operative relation to the indicating mark 17. Therefore when the jaws or arms 10 and 11 are moved toward an open position, the position of the mark 17 with respect to the scale of head 16 will indicate the extent to which the jaws have been opened. Therefore the diameter of the pipe may be ascertained upon the scale. In order to move the jaws and retain the jaws in the adjusted position, there has been provided a turning screw or worm 18 rotatably mounted in a cutout or pocket 19 formed in the jaw and having its threads engaging the teeth of the gear head 15. Turning of this screw 18 will move the jaws apart or bring them together according to the direction in which the screw is rotated. It will thus be seen that there has been provided a pair of calipers so constructed that they may be readily opened and closed and held in the adjusted position and further the extent to which they have been opened, shown upon the scale of the jaw 10.

What is claimed is:—

1. A measuring instrument of the class described, comprising jaws having their end portions pivotally connected together, one of said jaws having an indicating mark thereon and being provided with a gear head about the pivot point thereof, and the second gear being extended in overlapping relation to the first mentioned jaw and terminating in an arcuate scale head moving in operative position on the indicating mark on the first jaw, and a worm screw rotatably mounted in said second jaw and engaging the teeth of the gear head of the first jaw, rotation of the worm screw imparting movement to the first jaw.

2. A measuring instrument of the character described comprising a pair of jaws pivotally connected together, one of said jaws being provided with an indicating mark and the other jaw being extended in overlapping relation to the first jaw and terminating in an arcuate scale moving in operative relation to the indicating mark upon said first jaw, and means for imparting movement to the first jaw and holding the same in an adjusted position.

In testimony whereof I affix my signature in presence of two witnesses.

ESTER M. SEALY.

Witnesses:
 Geo. W. Gifford,
 J. R. Wilson.

Copies of this patent may be obtained for five cents each, by addressing the "Commissioner of Patents. Washington, D. C."